`US007189931B2`

(12) United States Patent
Hida et al.

(10) Patent No.: US 7,189,931 B2
(45) Date of Patent: Mar. 13, 2007

(54) SEAT OCCUPANT LOAD SENSOR

(75) Inventors: Toshihiko Hida, Gifu (JP); Takanori Okabe, Hiroshima (JP)

(73) Assignee: Kabushiki Kaisha Imasen Denki Seisakusho (JP)

( * ) Notice: Subject to any disclaimer, the term of this patent is extended or adjusted under 35 U.S.C. 154(b) by 0 days.

(21) Appl. No.: 10/531,144

(22) PCT Filed: Aug. 12, 2003

(86) PCT No.: PCT/JP03/10271

§ 371 (c)(1),
(2), (4) Date: Apr. 11, 2005

(87) PCT Pub. No.: WO2004/079308

PCT Pub. Date: Sep. 16, 2004

(65) Prior Publication Data

US 2005/0284668 A1    Dec. 29, 2005

(30) Foreign Application Priority Data

Mar. 5, 2003  (JP) ............................. 2003-058477
Apr. 9, 2003  (JP) ............................. 2003-105216

(51) Int. Cl.
*B60R 21/015* (2006.01)
(52) U.S. Cl. ................ 177/144; 177/211; 180/273
(58) Field of Classification Search ................ 177/144, 177/211; 180/273; 280/735
See application file for complete search history.

(56) References Cited

U.S. PATENT DOCUMENTS

| 4,421,186 | A | * | 12/1983 | Bradley | ...................... | 177/139 |
| 5,183,126 | A | * | 2/1993 | Kellenbach | .................. | 177/211 |
| 5,313,022 | A | * | 5/1994 | Piroozmandi et al. | ...... | 177/211 |
| 5,823,278 | A | * | 10/1998 | Geringer | ...................... | 177/144 |
| 5,837,946 | A | * | 11/1998 | Johnson et al. | ............. | 177/136 |
| 5,991,676 | A | * | 11/1999 | Podoloff et al. | .............. | 701/45 |
| 6,039,344 | A | | 3/2000 | Mehney et al. | | |
| 6,323,443 | B1 | * | 11/2001 | Aoki et al. | .................. | 177/144 |
| 6,677,539 | B2 | * | 1/2004 | Miura et al. | ................. | 177/136 |
| 6,924,441 | B1 | * | 8/2005 | Mobley et al. | ............. | 177/144 |
| 2003/0085060 | A1 | * | 5/2003 | Becker et al. | | |

FOREIGN PATENT DOCUMENTS

| JP | 11-310072 A | 11/1999 |
| JP | 2002-516631 A | 6/2002 |
| JP | 2003-11709 A | 1/2003 |
| WO | WO-02-43984 A2 | 6/2002 |

* cited by examiner

*Primary Examiner*—Randy W. Gibson
(74) *Attorney, Agent, or Firm*—Lucas & Mercanti, LLP

(57) ABSTRACT

An occupant load sensor (10) is fixed to a bracket (48) via a sleeve (60*a*) of a collar (60) arranged in an outer periphery of a thread (32) of a bolt portion (30), and a bush (62) interposed between the sleeve (60*a*) and a through hole (48*a*) of the bracket (48). Accordingly, a slight movement is allowed between the bolt portion (30) and the bracket (48) on the basis of gaps formed between the thread (32) and the sleeve (60*a*) and between the sleeve (60*a*) and the bush (62), and it is possible to cancel a force applied from the other directions than a vertical direction. Therefore, a load from the seat side is applied in the vertical direction and it is possible to accurately detect.

10 Claims, 15 Drawing Sheets

Fig. 1
(A)
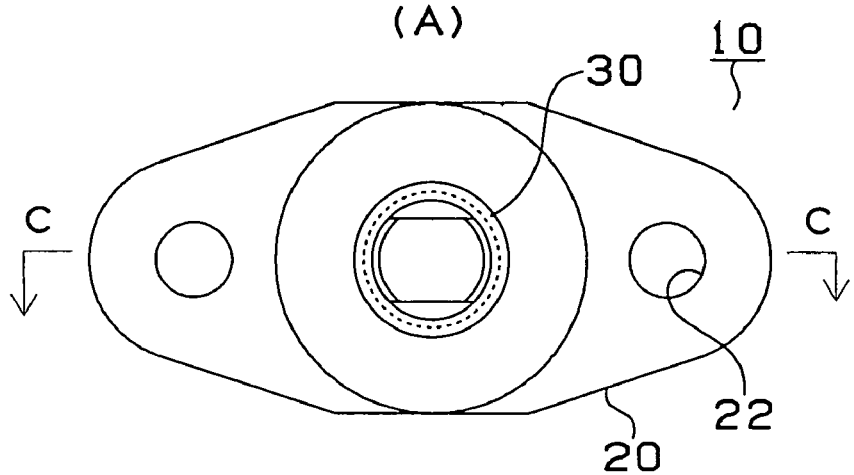
(B)
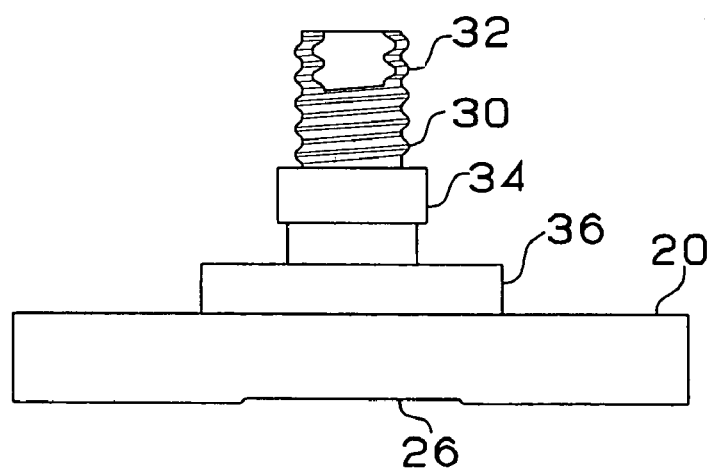
(C)
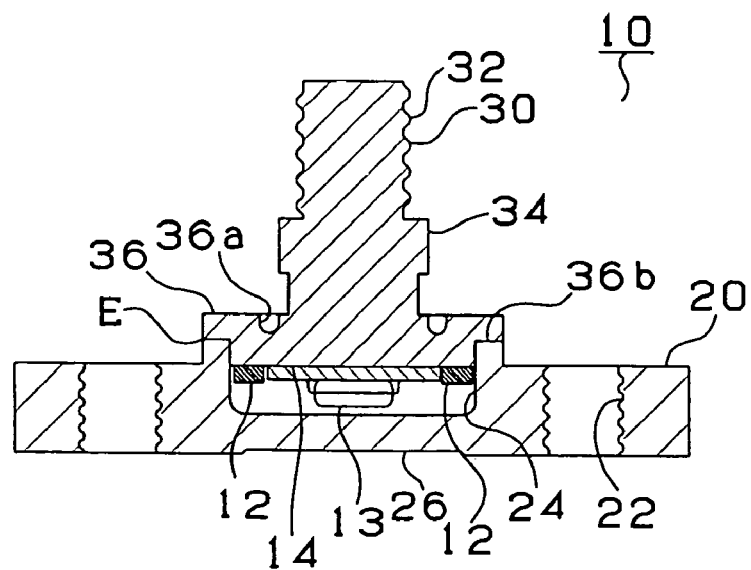

Fig.2
(A)
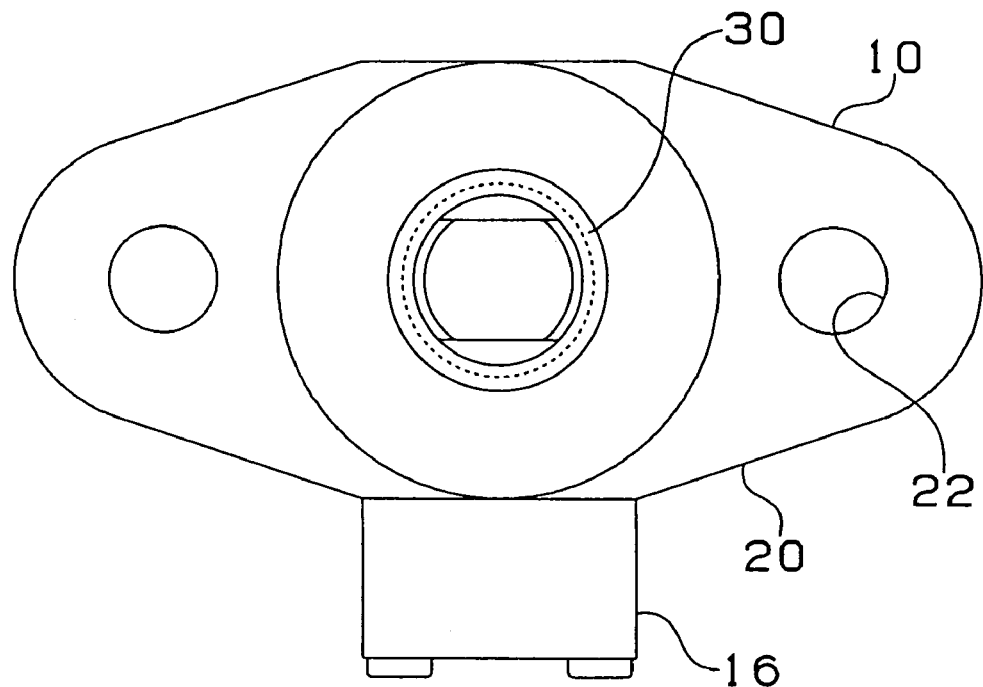
(B)
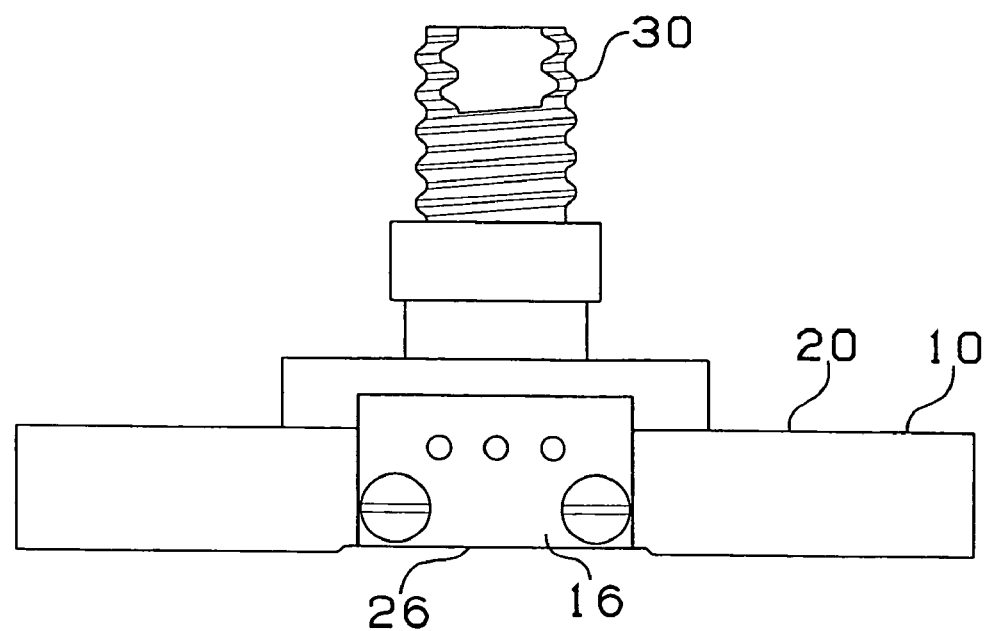

Fig.3
(A)
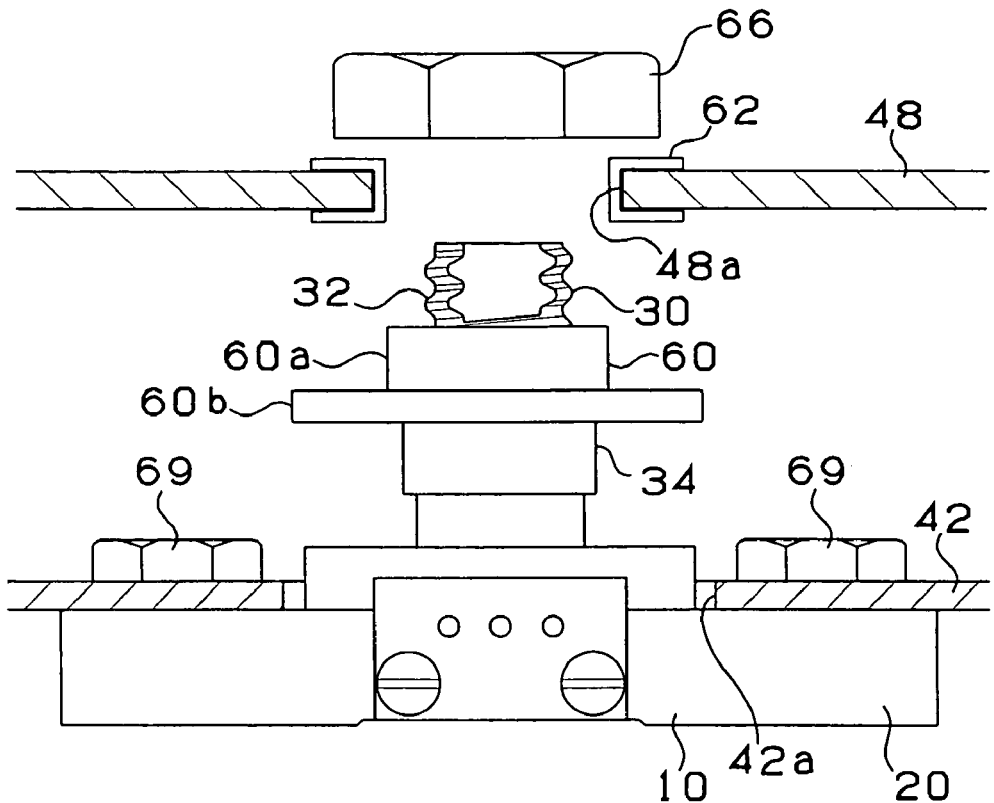
(B)
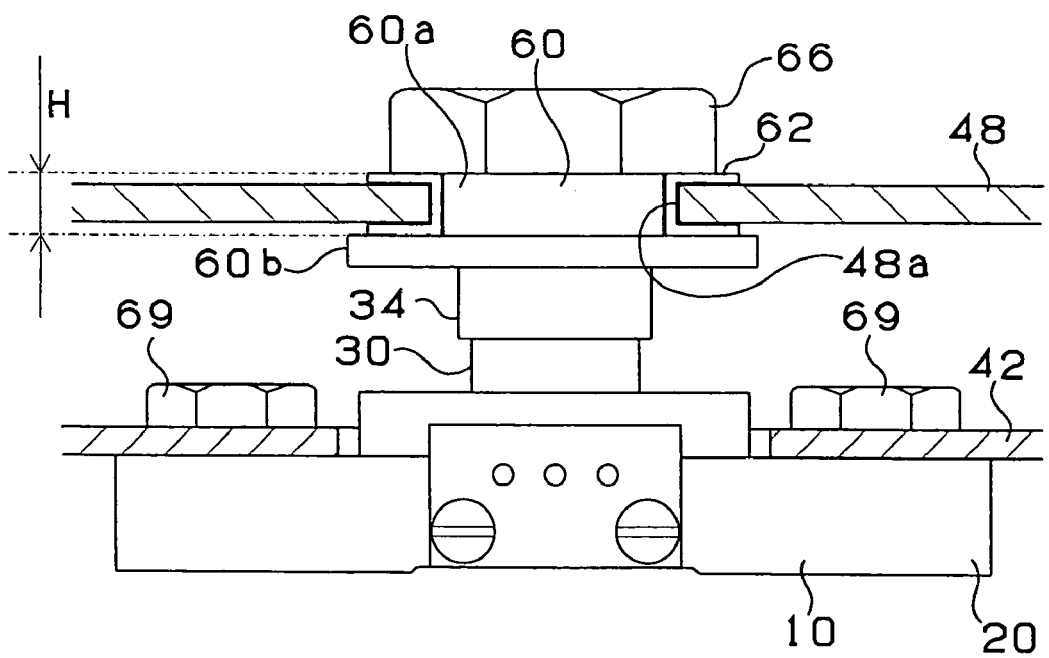

Fig.8
(A)
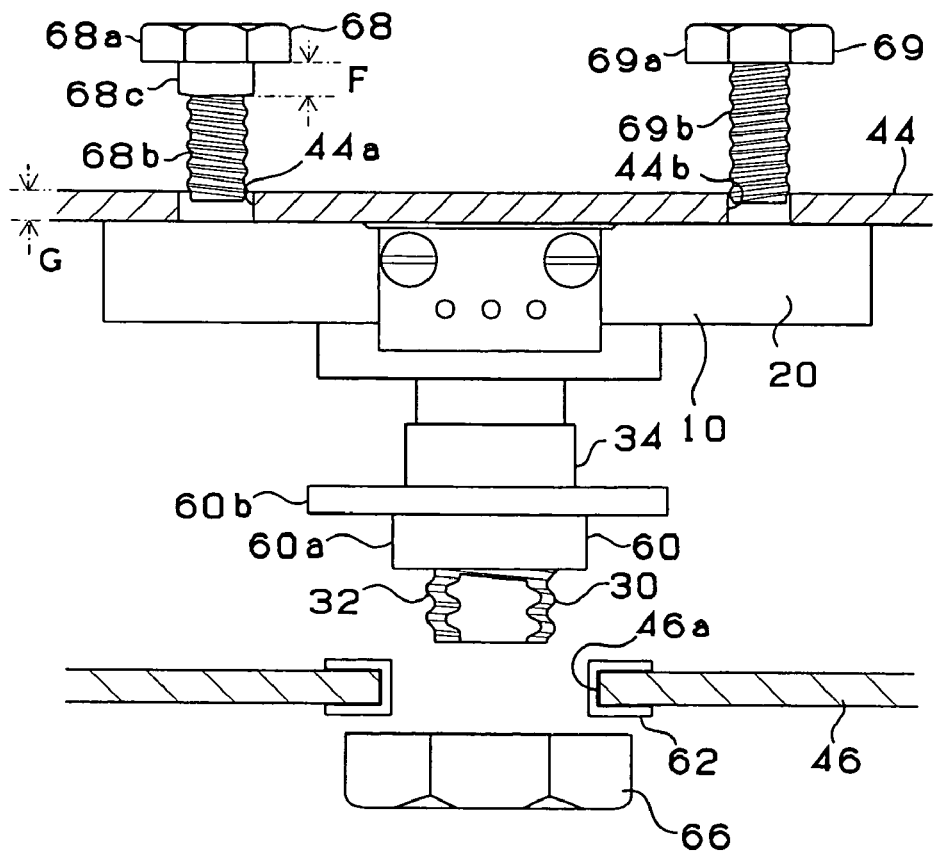
(B)
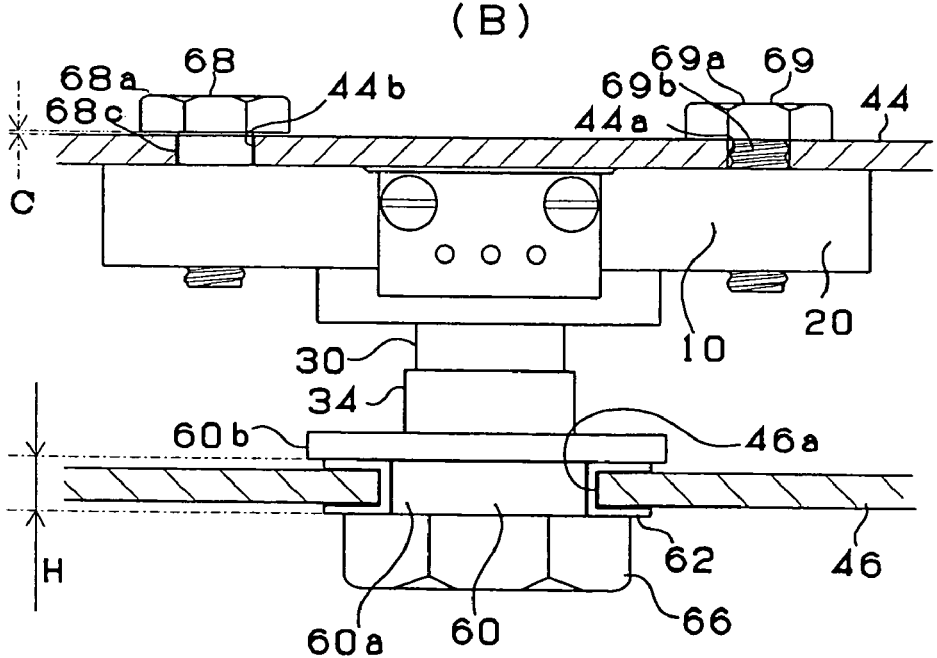

Fig.11
(A)
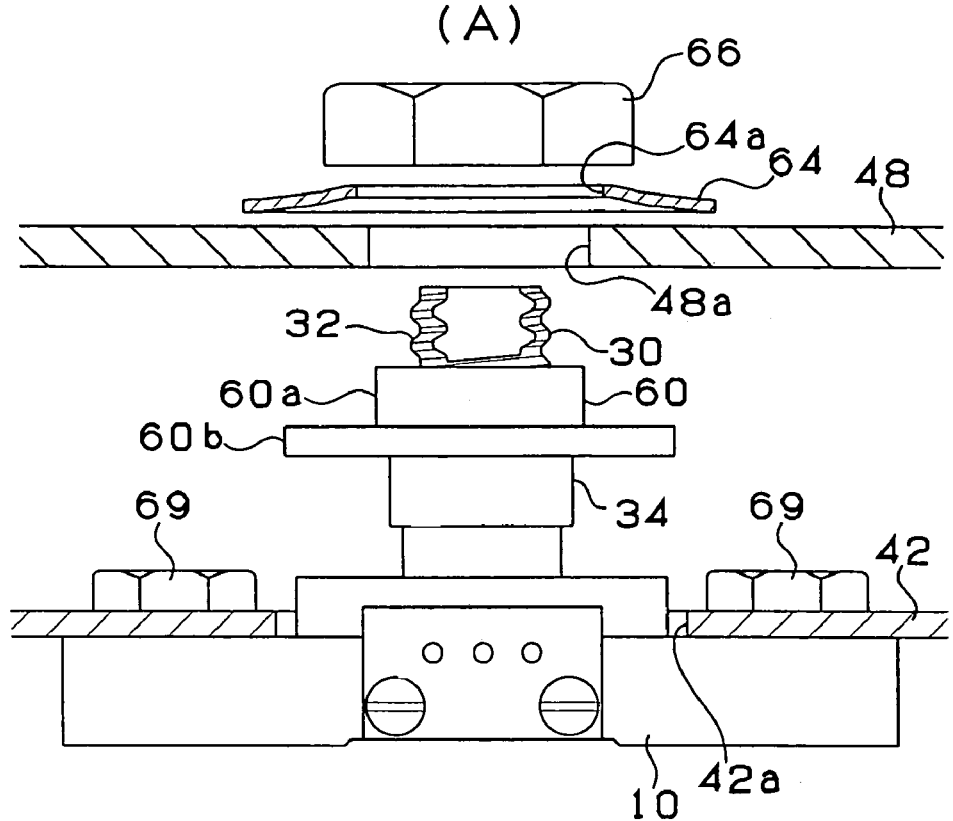
(B)
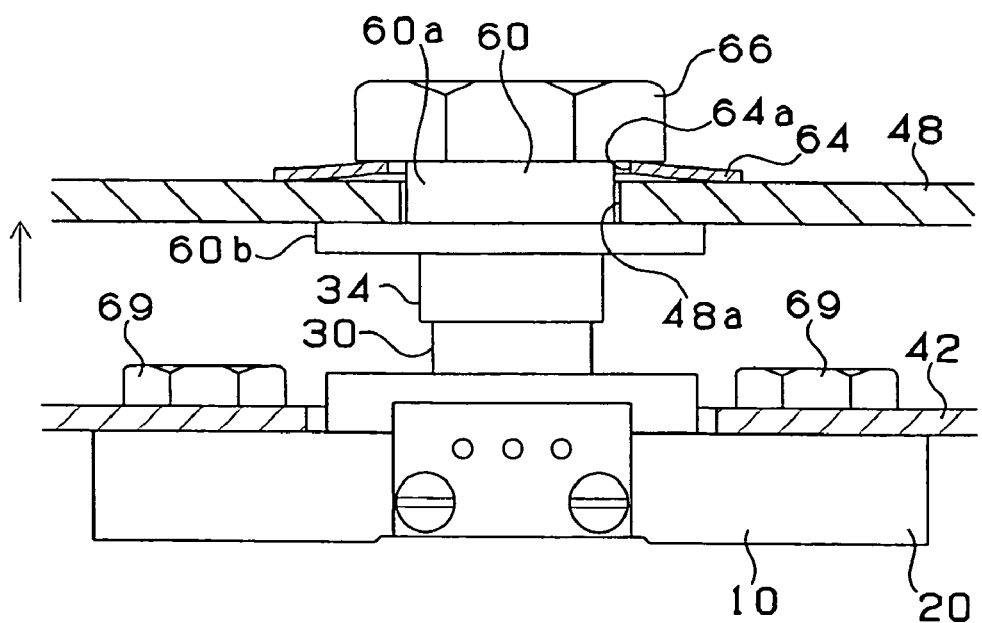

Fig.13
(A)
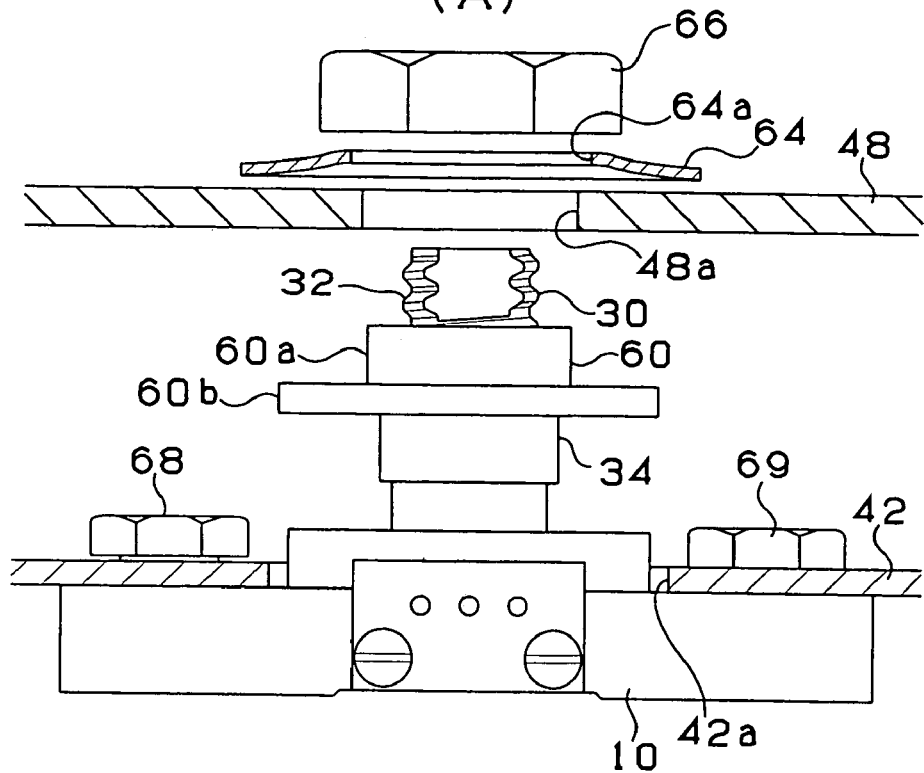
(B)
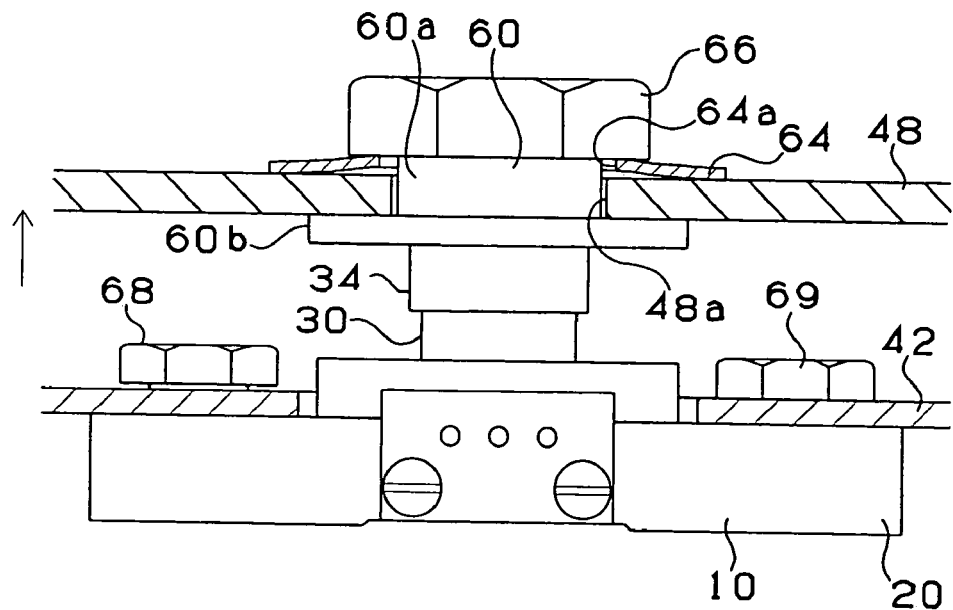

Fig.14
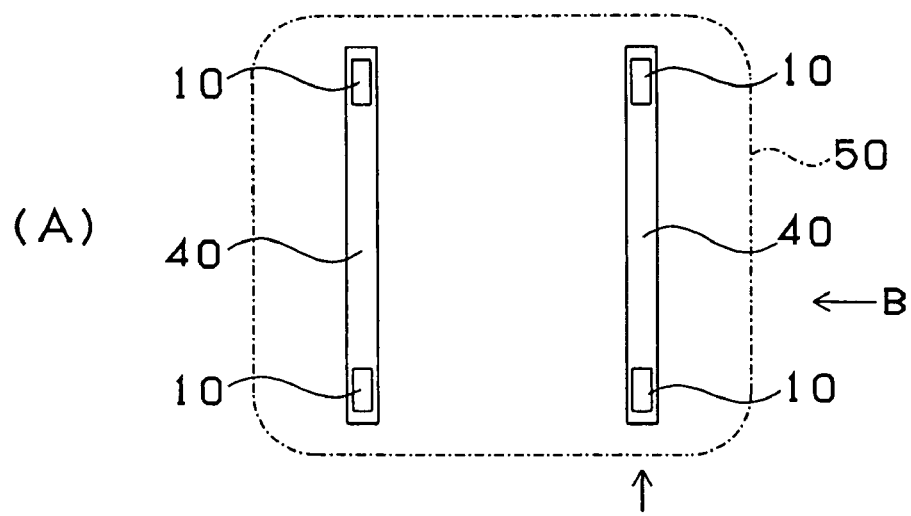
(A)
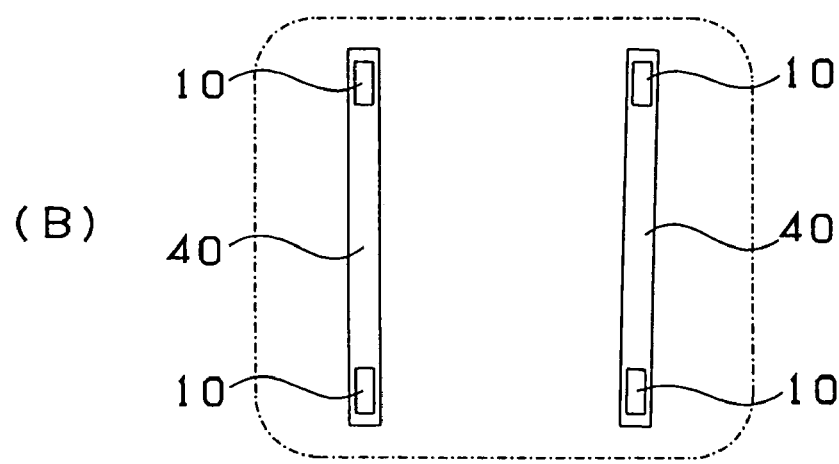
(B)
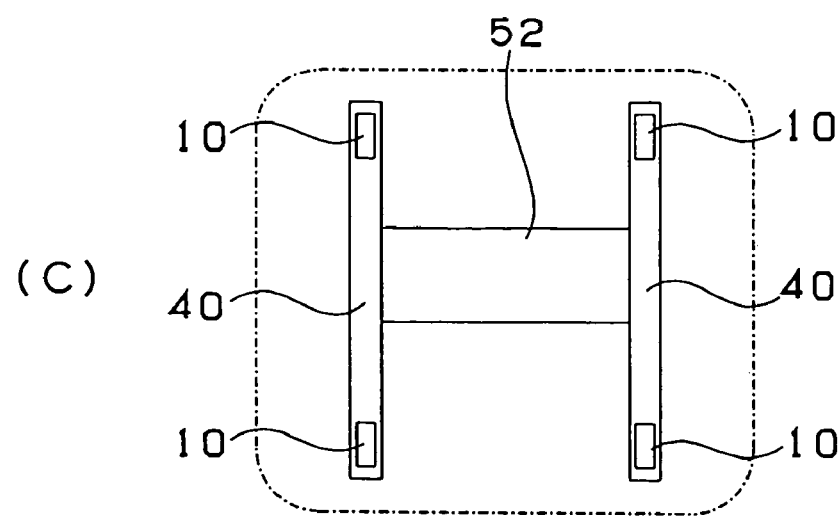
(C)

Fig.15
(A)
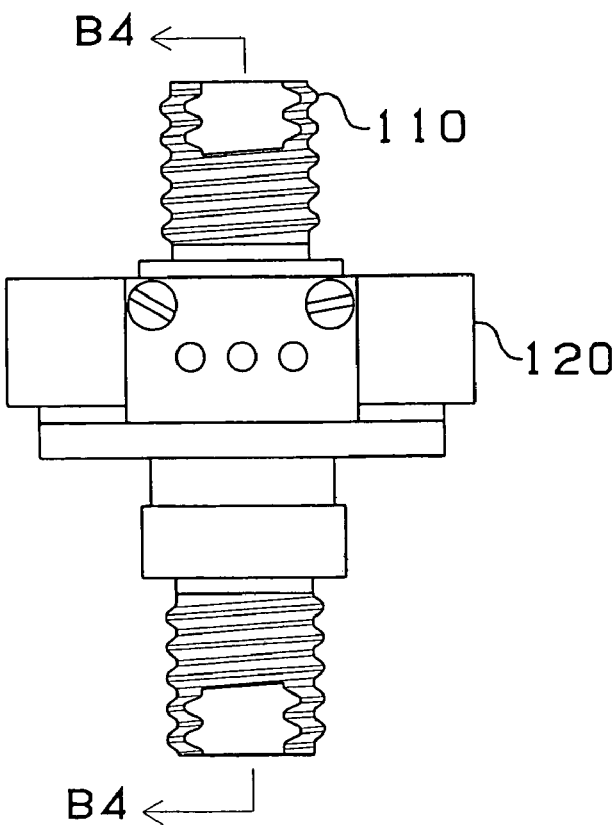
(B)
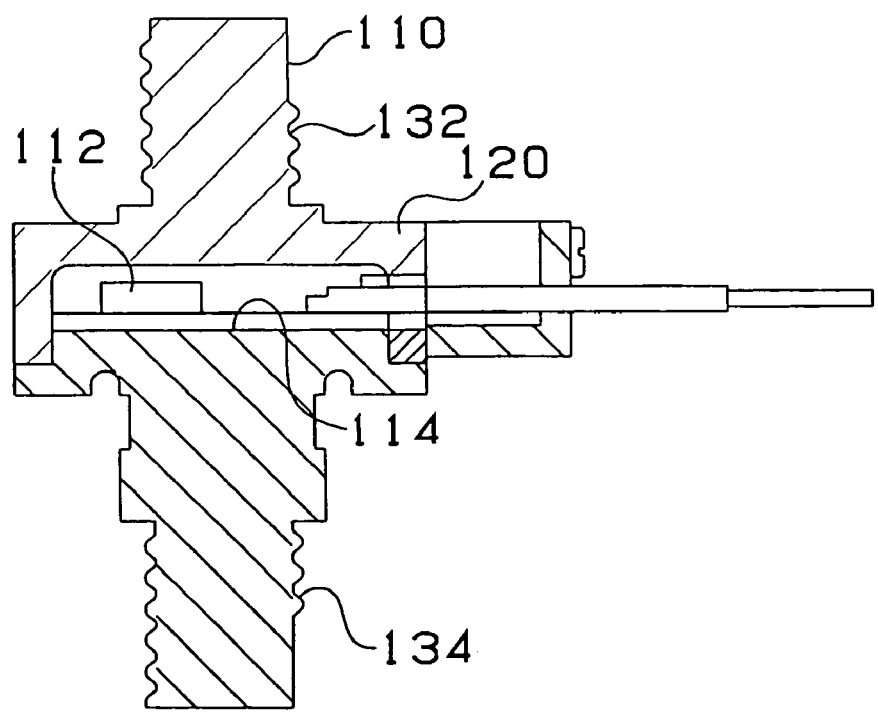

SEAT OCCUPANT LOAD SENSOR

TECHNICAL FIELD

The present invention relates to an occupant load sensor measuring a weight of an occupant seated on a seat of a vehicle.

BACKGROUND ART

In order to secure a safety of the occupant, a seat belt and an air bag are provided in a motor vehicle. In recent years, in order to further improve a safety, an operation of the seat belt and the air bag is controlled by identifying an adult or a child, and further in conformity to the weight of the occupant. In particular, in the case that the occupant is an adult, a pretension of the air bag and the seat belt is actuated, and in the case that the occupant is a child, the pretension is not actuated. Alternatively, a developing gas amount and a developing speed of the air bag are adjusted and the pretension of the seat belt is adjusted in conformity to the weight of the occupant.

The identification whether the occupant is an adult or a child mentioned above is generally executed by detecting the weight by an occupant load sensor attached to a seat. As the occupant load sensor mentioned above, there are, for example, JP 11-351952 A (publication 1), JP 11-1153 A (publication 2) and JP 9-207638 A (publication 3). In each of the publications, four occupant load sensors are arranged in four corners between a floor side seat fixing member (for example, a rail mount) and a seat side fixing member (for example, a seat rail), whereby the weight of the occupant (load) is measured.

In this case, it is necessary to firmly fix the seat for the vehicle to a floor in such a manner as to be prevented from coming off at a time of an accident. In the publications 2 and 3, there is provided a structure in which the occupant load sensor is arranged between the floor side seat fixing member (for example, the rail mount) and the seat side fixing member (for example, the seat rail), and there is a risk that the occupant load sensor is broken at a time of the accident and the seat falls away. On the other hand, in the publication 1, it is intended to prevent the seat from falling away at a time of the accident by arranging a displacement regulating mechanism in addition to the occupant load sensor, however, there is a problem that the structure becomes complicated and a manufacturing cost is increased due to the independently provided displacement regulating mechanism.

In order to do away with the displacement regulating mechanism so as to restrict the manufacturing cost, the occupant load sensor can be structured, for example, as shown in FIG. 15 in place of the structure in which the seat is reciprocated vertically and the load is applied to a sensor plate as in the publication 1. FIG. 15A shows a front view of the occupant load sensor, and FIG. 15B shows a cross section along a line B4—B4 in FIG. 15A. An occupant load sensor 110 is constituted by a main body portion 120 receiving a displacement sensor 112, an upper bolt portion 132 fixed, for example, to a seat rail side, and a lower bolt portion 134 fixed to a rail mount side. A strain surface 114 allowed to be deflected microscopically by the load is provided within the main body portion 120, and the displacement sensor 112 is arranged in the strain surface 114. In this structure, since it is not necessary to vertically reciprocate the seat, it is possible to obtain a necessary seat strength by manufacturing an entire occupant load sensor by a metal without using the displacement regulating mechanism as in the publication 1.

However, in the structure shown in FIG. 15, in the case that an accuracy of an attaching position of the seat rail with respect to the floor side rail mount is low, the occupant load sensor is attached in a state in which the occupant load sensor is inclined, and in a state in which a force in the other directions than a vertical direction is applied, so that there is a problem that a measuring accuracy is lowered.

The present invention is made for the purpose of solving the problem mentioned above, and an object of the present invention is to provide an occupant load sensor which can improve a detecting performance on the basis of a simple structure.

DISCLOSURE OF THE INVENTION

In order to solve the above problem, according to Claim 1, an occupant load sensor interposed between a floor side seat fixing member and a seat side fixing member and provided for measuring a load of an occupant sitting on a seat, comprising:

a flange portion which is attached to one of said floor side seat fixing member and said seat side fixing member while being in surface contact there with;

a bolt portion which is formed in a vertical direction with respect to said flange portion, and is attached to the other of said floor side seat fixing member and said seat side fixing member via a nut; and a sensor which is arranged in a strain surface provided between said flange portion and said bolt portion, and is provided for detecting a load applied to said bolt portion in an axial direction.

In accordance with a first aspect, the occupant load sensor is attached to one of the floor side seat fixing member and the seat side fixing member while being in surface contact with the fixing member by the flange portion, and the bolt portion formed in the vertical direction to the flange portion is attached to the other of the floor side seat fixing member and the seat side fixing member via a nut. Accordingly, the load from the seat is applied in the vertical direction, and it is possible to measure the load by the sensor. Further, it is possible to lower a hip point of the seat by receiving the flange portion within an upper rail or a lower rail.

According to Claim 2, an occupant load sensor interposed between a floor side seat fixing member and a seat side fixing member and provided for measuring a load of an occupant sitting on a seat, wherein said occupant load sensor comprising:

a fixing portion which is attached to one of said floor side seat fixing member and said seat side fixing member;

a bolt portion which is inserted to a through hole in the other of said floor side seat fixing member and said seat side fixing member and is attached via a nut; and a sensor which is arranged in a strain surface provided between said fixing portion and said bolt portion, and is provided for detecting a load applied to said bolt portion in an axial direction, and wherein said occupant load sensor is fixed to the other of said floor side seat fixing member and said seat side fixing member via a sleeve arranged in an outer periphery of said bolt portion, and a liner member interposed between said sleeve and the through hole in the other of said floor side seat fixing member and said seat side fixing member.

In accordance with a second aspect, the occupant load sensor is fixed to the other of the floor side seat fixing member and the seat side fixing member via the sleeve arranged in the outer periphery of the bolt portion, and the liner member interposed between the sleeve and the through hole in the other of the floor side seat fixing member and the seat side fixing member. Accordingly, a slight motion can be allowed between the bolt portion and the other of the floor side seat fixing member and the seat side fixing member to which the bolt portion is fixed, on the basis of the gap formed between the bolt portion and the sleeve, and the gap between the sleeve and the liner member, and it is possible to cancel the force applied from the other directions than the vertical direction. Therefore, the load from the seat side is applied to the sensor in the vertical direction, and it is possible to accurately detect the load. Further, even if the accuracy of the attaching position of the seat side fixing member with respect to the floor side seat fixing member is low, and the occupant load sensor is attached in a state in which the force in the other directions than the vertical direction is applied, the load from the seat side is applied to the sensor in the vertical direction and it is possible to accurately detect the load because the slight motion is allowed between the bolt portion and the other of the floor side seat fixing member and the seat side fixing member.

According to Claim 3, an occupant load sensor interposed between a floor side seat fixing member and a seat side fixing member and provided for measuring a load of an occupant sitting on a seat, wherein said occupant load sensor comprising:

a flange portion which is attached to one of said floor side seat fixing member and said seat side fixing member while being in surface contact therewith;

a bolt portion which is formed in a vertical direction with respect to said flange portion and is attached to the other of said floor side seat fixing member and said seat side fixing member via a nut; and a sensor which is arranged in a strain surface provided between said flange portion and said bolt portion, and is provided for detecting a load applied to said bolt portion in an axial direction, and wherein said occupant load sensor is fixed to the other of said floor side seat fixing member and said seat side fixing member via a sleeve arranged in an outer periphery of said bolt portion, and a bush interposed between said sleeve and a through hole in the other of said floor side seat fixing member and said seat side fixing member.

In accordance with a third aspect, the occupant load sensor is fixed to the other of the floor side seat fixing member and the seat side fixing member via the sleeve arranged in the outer periphery of the bolt portion, and the liner member interposed between the sleeve and the through hole in the other of the floor side seat fixing member and the seat side fixing member. Accordingly, a slight motion can be allowed between the bolt portion and the other of the floor side seat fixing member and the seat side fixing member to which the bolt portion is fixed, on the basis of the gap formed between the bolt portion and the sleeve, and the gap between the sleeve and the liner member, and it is possible to cancel the force applied from the other directions than the vertical direction. Therefore, the load from the seat side is applied to the sensor in the vertical direction, and it is possible to accurately detect the load. Further, even if the accuracy of the attaching position of the seat side fixing member with respect to the floor side seat fixing member is low, and the occupant load sensor is attached in a state in which the force in the other directions than the vertical direction is applied, the load from the seat side is applied to the sensor in the vertical direction and it is possible to accurately detect the load because the slight motion is allowed between the bolt portion and the other of the floor side seat fixing member and the seat side fixing member. In particular, the occupant load sensor is attached to one of the floor side seat fixing member and the seat side fixing member while being in surface contact with the fixing member by the flange portion, and the bolt portion formed in the vertical direction to the flange portion is attached to the other of the floor side seat fixing member and the seat side fixing member via a nut. Accordingly, the load from the seat is applied in the vertical direction, and it is possible to accurately measure the load by the sensor.

According to Claim 4, an occupant load sensor interposed between a floor side seat fixing member and a seat side fixing member and provided for measuring a load of an occupant sitting on a seat, wherein said occupant load sensor comprising:

a flange portion which is attached to one of said floor side seat fixing member and said seat side fixing member while being in surface contact therewith;

a bolt portion which is formed in a vertical direction with respect to said flange portion and is attached to the other of said floor side seat fixing member and said seat side fixing member via a nut; and a sensor which is arranged in a strain surface provided between said flange portion and said bolt portion, and is provided for detecting a load applied to said bolt portion in an axial direction, and wherein said occupant load sensor is fixed to the other of said floor side seat fixing member and said seat side fixing member via a sleeve arranged between said bolt portion and a through hole in the other of said floor side seat fixing member and said seat side fixing member, and a flat washer inserting said sleeve therethrough and interposed between the other of said floor side seat fixing member and said seat side fixing member and a nut.

In accordance with a fourth aspect, the occupant load sensor is fixed to the other of the floor side seat fixing member and the seat side fixing member via the sleeve arranged in the bolt portion and the through hole in the other of the floor side seat fixing member and the seat side fixing member, and the flat washer inserting the sleeve therethrough and interposed between the other of the floor side seat fixing member and the seat side fixing member and the nut. Accordingly, a slight motion can be allowed between the bolt portion and the other of the floor side seat fixing member and the seat side fixing member to which the bolt portion is fixed, on the basis of the gap formed between the bolt portion and the sleeve, and the gap formed between the other of the floor side seat fixing member and the seat side fixing member in which the flat washer is interposed and the nut, and it is possible to cancel the force applied from the other directions than the vertical direction. Therefore, the load from the seat side is applied to the sensor in the vertical direction, and it is possible to accurately detect the load. Further, even if the accuracy of the attaching position of the seat side fixing member with respect to the floor side seat fixing member is low, and the occupant load sensor is attached in a state in which the force in the other directions than the vertical direction is applied, the load from the seat side is applied to the sensor in the vertical direction and it is possible to accurately detect the load because the slight motion is allowed between the bolt portion and the other of the floor side seat fixing member and the seat side fixing member. In particular, the occupant load sensor is attached to one of the floor side seat fixing member and the seat side fixing member while being in surface contact with the fixing member by the flange portion, and the bolt portion formed in the vertical direction to the flange portion is attached to the other of the floor side seat fixing member and the seat side fixing member via a nut. Accordingly, the load from the seat is applied in the vertical direction, and it is possible to accurately measure the load by the sensor.

In the second aspect to the fourth aspect, it is preferable that the sleeve is a part of the collar. Since the flange of the collar is brought into contact with the other of the floor side seat fixing member and the seat side fixing member to which the bolt portion is fixed, and the load in the axial (vertical) direction is generated with respect to the sleeve, the load from the seat is applied in the vertical direction, and it is possible to accurately measure the load by the sensor. Further, the number of the parts is small and it is easy to assemble.

In the first aspect to the fifth aspect, it is preferable that a pair of floor side seat fixing members are connected via the bracket. A relative attaching position of a pair of floor side seat fixing members is not displaced on the basis of the connection by the bracket, and it is possible to prevent the occupant load sensor from being attached between the floor side fixing member and the seat side fixing member in a state in which the force in the other directions than the vertical direction is applied.

In order to solve the above problem, according to Claim 7, an occupant load sensor interposed between a floor side seat fixing member and a seat side fixing member and provided for measuring a load of an occupant sitting on a seat, comprising:

a flange portion which is provided with a plurality of screw holes for fastening by bolts and is attached to one of said floor side seat fixing member and said seat side fixing member while being in surface contact therewith;

an attaching portion which is formed in a vertical direction with respect to said flange portion, and is attached to the other of said floor side seat fixing member and said seat side fixing member; and a sensor which is provided for detecting a load applied to said attaching portion in an axial direction, wherein at least one of a plurality of screw holes provided in said flange portion is fastened by bolts so as to allow a motion between said flange portion and one of said floor side seat fixing member and said seat side fixing member.

In accordance with a seventh aspect, it is possible to make the torsion of one of the floor side seat fixing member and the seat side fixing member hard to be transmitted to the occupant load sensor, by allowing a part of the flange portion to move. Accordingly, the load from the seat side is applied to the sensor in the vertical direction, and it is possible to accurately detect the load. Further, even if the occupant load sensor is attached in the state in which the accuracy of the attaching portion of the seat side fixing member with respect to the floor side seat fixing member is low, and the force in the other directions than the vertical direction is applied, the load from the seat side is applied to the sensor in the vertical direction and it is possible to accurately detect the load because the slight motion is allowed between a part of the flange portion and one of the floor side seat fixing member and the seat side fixing member.

According to Claim 8, an occupant load sensor interposed between a floor side seat fixing member and a seat side fixing member and provided for measuring a load of an occupant sitting on a seat, comprising:

a flange portion which is provided with a plurality of screw holes for fastening by bolts and is attached to one of said floor side seat fixing member and said seat side fixing member while being in surface contact therewith;

a bolt portion which is formed in a vertical direction with respect to said flange portion, and is attached to the other of said floor side seat fixing member and said seat side fixing member via a nut; and a sensor which is provided for detecting a load applied to said bolt portion in an axial direction, wherein one of a plurality of screw holes provided in said flange portion is fixed by a shoulder bolt provided with a step portion higher than a thickness of one of said floor side seat fixing member and said seat side fixing member, whereby an air gap is provided between a head of the shoulder bolt and one of said floor side seat fixing member and said seat side fixing member.

In accordance with an eighth aspect, the slight motion is allowed between the shoulder bolt fixing portion of the flange portion and one of the floor side seat fixing member and the seat side fixing member to which the flange portion is fixed, on the basis of the air gap (the gap) formed between the head of the shoulder bolt and one of the floor side seat fixing member and the seat side fixing member, and it is possible to make the torsion of one of the floor side seat fixing member and the seat side fixing member hard to be transmitted to the occupant load sensor. Accordingly, the load from the seat side is applied to the sensor in the vertical direction, and it is possible to accurately detect the load. Further, even if the accuracy of the attaching position of the seat side fixing member with respect to the floor side seat fixing member is low, and the occupant load sensor is attached in a state in which the force in the other directions than the vertical direction is applied, the load from the seat side is applied to the sensor in the vertical direction and it is possible to accurately detect the load because the slight motion is allowed between the shoulder bolt fixing portion of the flange portion and one of the floor side seat fixing member and the seat side fixing member. Further, the occupant load sensor is attached to one of the floor side seat fixing member and the seat side fixing member while being in surface contact with the fixing member by the flange portion, and the bolt portion formed in the vertical direction to the flange portion is attached to the other of the floor side seat fixing member and the seat side fixing member via the nut. Accordingly, the load from the seat is applied in the vertical direction, and it is possible to accurately measure the load by the sensor.

According to Claim 9, an occupant load sensor, wherein a occupant load sensor is fixed to the other of a floor side seat fixing member and a seat side fixing member via a sleeve arranged in an outer periphery of a bolt portion, and a bush interposed between a sleeve and a through hole in the other of a floor side seat fixing member and a seat side fixing member. Accordingly, the slight motion can be allowed between the bolt portion and the other of the floor side seat fixing member and the seat side fixing member to which the bolt portion is fixed, on the basis of the gap formed between the bolt portion and the sleeve, and the gap formed between the sleeve and the bush, and it is possible to cancel the force applied from the other directions than the vertical direction. Therefore, the load from the seat side is applied to the sensor in the vertical direction, and it is possible to accurately detect the load. Further, even if the accuracy of the attaching position of the seat side fixing member with respect to the floor side seat fixing member is low, and the occupant load sensor is attached in the state in which the force in the other directions than the vertical direction is applied, the load from the seat side is applied to the sensor in the vertical direction and it is possible to accurately detect the load because the slight motion is allowed between the bolt portion and the other of the floor side seat fixing member and the seat side fixing member. In particular, the occupant load sensor is attached to one of the floor side seat fixing member and the seat side fixing member while being in surface contact with the fixing member by the flange portion, and the bolt portion formed in the vertical direction to the flange portion is attached to the other of the floor side seat fixing member and the seat side fixing member via the nut. Accordingly, the load from the seat is applied in the vertical direction, and it is possible to accurately measure the load by the sensor.

According to Claim 10, an occupant load sensor, wherein a occupant load sensor is fixed to the other of a floor side seat fixing member and a seat side fixing member via a sleeve arranged between a bolt portion and a through hole in the other of a floor side seat fixing member and a seat side fixing member, and a flat washer inserting a sleeve therethrough and interposed between the other of a floor side seat fixing member and a seat side fixing member and the nut.

Accordingly, the slight motion can be allowed between the bolt portion and the other of the floor side seat fixing member and the seat side fixing member to which the bolt portion is fixed, on the basis of the gap formed between the bolt portion and the sleeve, and the gap formed between the other of the floor side seat fixing member and the seat side fixing member in which the flat washer is interposed and the nut, and it is possible to cancel the force applied from the other directions than the vertical direction. Therefore, the load from the seat side is applied to the sensor in the vertical direction, and it is possible to accurately detect the load. Further, even if the accuracy of the attaching position of the seat side fixing member with respect to the floor side seat fixing member is low, and the occupant load sensor is attached in a state in which the force in the other directions than the vertical direction is applied, the load from the seat side is applied to the sensor in the vertical direction and it is possible to accurately detect the load because the slight motion is allowed between the bolt portion and the other of the floor side seat fixing member and the seat side fixing member. In particular, the occupant load sensor is attached to one of the floor side seat fixing member and the seat side fixing member while being in surface contact with the fixing member by the flange portion, and the bolt portion formed in the vertical direction to the flange portion is attached to the other of the floor side seat fixing member and the seat side fixing member via a nut. Accordingly, the load from the seat is applied in the vertical direction, and it is possible to accurately measure the load by the sensor.

In the ninth aspect to the eleventh aspect, it is preferable that the sleeve is a part of the collar. Since the flange of the collar is brought into contact with the other of the floor side seat fixing member and the seat side fixing member to which the bolt portion is fixed, and the load in the axial (vertical) direction is generated with respect to the sleeve, the load from the seat is applied in the vertical direction, and it is possible to accurately measure the load by the sensor. Further, the number of the parts is small and it is easy to assemble.

BRIEF DESCRIPTION OF THE DRAWINGS

FIG. 1A is a plan view of an occupant load sensor in accordance with a first embodiment;

FIG. 1B is a side elevational view;

FIG. 1C is a cross sectional view along a line C—C in FIG. 1A;

FIG. 2A is a plan view of a state in which a terminal box is attached to the occupant load sensor in accordance with the first embodiment;

FIG. 2B is a side elevational view;

FIG. 3A is an explanatory view of an attachment of the occupant load sensor;

FIG. 3B is a cross sectional view along a line B—B in FIG. 4A;

FIG. 8A is an explanatory view of an attachment of the occupant load sensor in accordance with the first embodiment;

FIG. 8B is a cross sectional view along a line B2—B2 in FIG. 9A;

FIG. 11A is a side elevational view showing a state before an occupant load sensor in accordance with a second embodiment is attached to a seat rail;

FIG. 11B is a side elevational view showing a state after being attached;

FIG. 13A is a side elevational view showing a state before the occupant load sensor in accordance with the modified example of the second embodiment is attached to the seat rail;

FIG. 13B is a side elevational view showing a state after being attached;

FIGS. 14A and 14B are explanatory views showing an attached position of the occupant load sensor with respect to the seat;

FIG. 14C is an explanatory view showing an occupant load sensor in accordance with a third embodiment;

FIG. 15A is a side elevational view of an occupant load sensor in accordance with a prior art; and FIG. 15B is a cross sectional view along a line B4—B4 in FIG. 15A.

BEST MODE FOR CARRYING OUT THE INVENTION

A description will be given below of an occupant load sensor in accordance with an embodiment of the present invention with reference to the accompanying drawings.

[First Embodiment]

Figure 4:
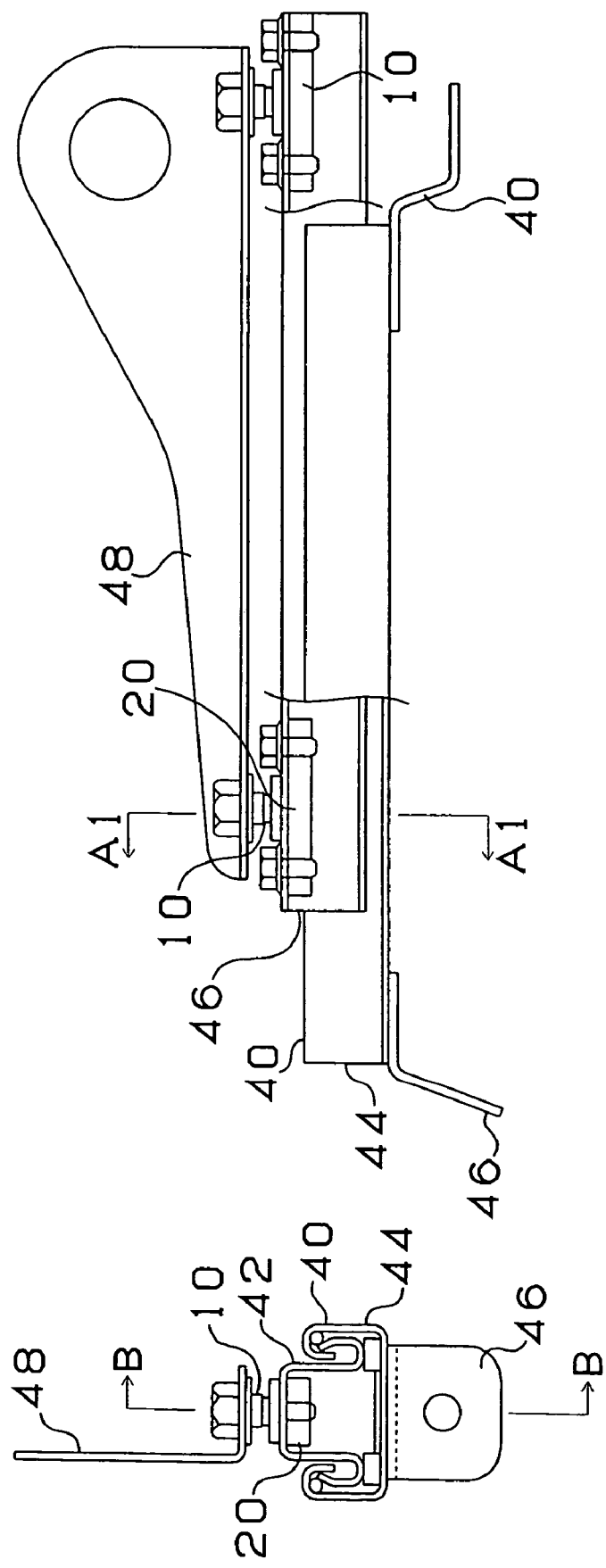
FIG. 4B is a side elevational view of a seat rail 40 shown in FIG. 14A as seen from an arrow B side.
FIG. 4A is a cross sectional view along a line A1—A1 in FIG. 4B.

FIGS. 1 to 3 show an occupant load sensor 10 in accordance with a first embodiment, FIG. 4 shows a state in which the occupant load sensor 10 is attached to a seat rail, and FIG. 14A shows an attached position of the occupant load sensor 10 with respect to a seat.

FIG. 14A is an explanatory view of a seat 50 in a plan view. A pair of seat rails 40 are arranged below the seat 50. The occupant load sensor 10 is arranged in four corners in an upper side of the seat rail 40.

FIG. 4B is a side elevational view of a seat rail 40 shown in FIG. 14A as seen from an arrow B side, and FIG. 4A is a cross sectional view along a line A—A in FIG. 4B.

The seat rail 40 is constituted by an upper rail 42 and a lower rail 44, the lower rail 44 is fixed to a floor via a foot 46, and the upper rail 42 is structured such as to be slidable on the lower rail 44. A bracket 48 for attaching the seat is fixed onto the upper rail 42 via the occupant load sensor 10.

FIG. 1A is a plan view of the occupant load sensor in accordance with the first embodiment, FIG. 1B is a side elevational view, and FIG. 1C is a cross sectional view along a line C—C in FIG. 1A. FIG. 2A is a plan view of a state in which a terminal box 16 is attached to the occupant load sensor in accordance with the first embodiment, and FIG. 2B is a side elevational view. FIG. 3A is an explanatory view of an attachment of the occupant load sensor, and FIG. 3B is a cross sectional view along a line B—B in FIG. 4A.

As shown in FIG. 3B showing the cross section along the line B—B in FIG. 4A, the occupant load sensor 10 is constituted by a flange portion 20 which is in surface contact with a lower surface of the upper rail (a floor side seat fixing member) 42 and is attached by a bolt 69, and a bolt portion 30 which is formed in a vertical direction with respect to the flange portion 20 and is attached to the bracket (a seat side fixing member) 48 side via a nut 66.

As shown in FIG. 1C, in the flange portion 20, there are formed a pair of screw holes 22 for fixing the bolt 69, a recess portion 24 for fixing the bolt portion 30, and a depression 26 in a lower portion of the recess portion 24. The depression 26 is formed for achieving a flatness in a lower end surface of the screw hole 22.

The bolt portion 30 is structured by an upper end thread 32, a middle stage flange 34 and a lower stage flange 36. The thread 32 carries out fixation of the nut 66 and insertion of a collar 60 mentioned below. The middle stage flange 34 extending in a horizontal direction carries out support of the collar 60 mentioned below. A concentric groove 36a is formed at an approximately center position of an upper surface of the lower stage flange 36 extending in a horizontal direction for generating a microscopic deflection on a lower surface (a strain surface) 14 as mentioned below. A step portion 36b for fitting into the recess portion 24 of the flange portion 20 is formed in an outer peripheral side of a lower surface of the lower stage flange 36. A connection portion shown by reference symbol E in the drawing between the step portion 36b and the flange portion 20 is welded by a laser welding. An air gap for arranging a pair of silicone sensors (strain sensors) 12 and sensor IC chips 13 is formed within the recess portion 24. A lower surface of the lower stage flange 36 structures the strain surface 14 to which the sensor 12 is attached. In other words, when a load in a vertical direction is applied between the bolt portion 30 and the flange portion 20, the strain surface 14 is deflected microscopically, and the sensor 12 detects the deflection as a load. A signal line (not shown) is connected to the sensor 12 via a terminal box 16 shown in FIG. 2. In this case, in this embodiment, the sensor 12 is arranged in the lower surface of the lower stage flange 36, however, it can be, of course, arranged in a bottom portion of the recess portion 24.

A description will be given of an attachment of the occupant load sensor 10 with reference to FIG. 3A.

First, the bolt portion 30 of the occupant load sensor 10 is inserted through an opening 42a of the upper rail 42 from a back surface side of the upper rail 42, and the flange portion 20 is fixed to the upper rail 42 by a bolt 69. Next, the collar 60 is inserted through the thread 32 of the bolt portion 30, and is supported by the middle stage flange 34. The collar 60 is constituted by a sleeve 60a and a flange 60b. On the other hand, a bush (a liner member) 62 constituted by a thin cylindrical liner is attached to a through hole 48a of the bracket 48 for fitting to an inner surface. Further, as shown in FIG. 3B, the nut 66 is fixed to the thread 32 of the bolt portion 30 in a state in which the sleeve 60a of the collar 60 is inserted into the bush 62.

In this case, a gap larger than an assembly error is set between an outer periphery of the thread 32 of the bolt portion and an inner periphery of the sleeve 60a of the collar 60. In the same manner, a gap larger than an assembly error is set between an outer periphery of the sleeve 60a and an inner periphery of the bush 62. A height H of the sleeve 60a is set slightly larger than a dimension obtained by adding a thickness of the bush 62 to a thickness of the bracket 48.

In the first embodiment, the occupant load sensor 10 is fixed to the bracket 48 via the sleeve 60a of the collar 60 arranged in an outer periphery of the thread 32 of the bolt portion 32, and the bush 62 interposed between the sleeve 60a and the through hole 48a of the bracket 48. Accordingly, the slight movement is allowed between the bolt portion 30 and the bracket 48 to which the bolt portion 30 is fixed, on the basis of the gap formed between the thread 32 and the sleeve 60a, and the gap formed between the sleeve 60a and the bush 62, and the sleeve 60a slides along the inner surface of the bush 62, whereby it is possible to cancel the force applied from the other directions than the vertical direction. Therefore, the load from the seat side is applied to the sensor 12 in the vertical direction, and it is possible to accurately detect the load. In particular, the seat rail 40 or the like is deflected due to the load, and it is possible to accurately measure even if the force is hard to be applied to the occupant load sensor 10 in the vertical direction. Further, since the slight movement is allowed between the bolt portion 30 and the bracket 48 even if the accuracy of the attached position of the bracket 48 with respect to the seat rail 40 is low, and the occupant load sensor 10 is attached in a state in which the force in the other directions than the vertical direction is applied, the load from the seat side is applied to the sensor 12 in the vertical direction, and it is possible to accurately detect the load.

In particular, the occupant load sensor 10 is attached to the upper rail 42 of the seat rail 40 while being in surface contact therewith by the flange portion 20, and the bolt portion 30 formed in the vertical direction with respect to the flange portion 20 is attached to the bracket 48 via the nut 66. Accordingly, the load from the seat is applied to the vertical direction, and it is possible to accurately measure the load by the sensor 12. Further, it is possible to lower the hip point of the seat by receiving the flange portion 20 in the lower side of the upper rail 42.

Further, in the first embodiment, since the flange 60b of the collar 60 is brought into contact with the lower surface of the bracket 48 to which the bolt portion 30 is fixed and the upper surface of the middle stage flange 34, and generates the load in the axial (vertical) direction with respect to the sleeve 60a, the load from the seat is applied in the vertical direction, and it is possible to accurately measure the load by the sensor. Further, the number of the parts is reduced, and it is easy to assemble. In this case, it is possible to use a sleeve provided with no flange as it is, in place of using the collar 60.

Figure 5:
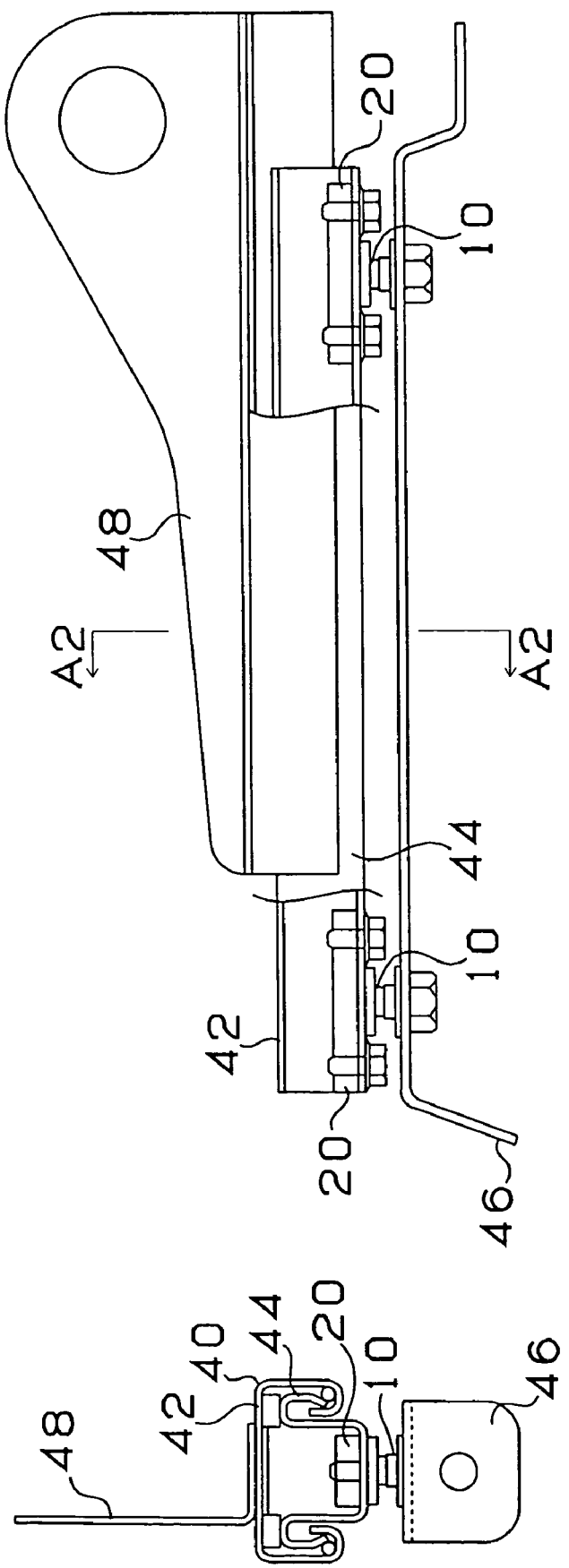
FIG. 5B is a side elevational view showing a state in which the occupant load sensor in accordance with the first embodiment is attached to a seat rail in accordance with the other example.
FIG. 5A is a cross sectional view along a line A2—A2 in FIG. 5B.
Figure 6:
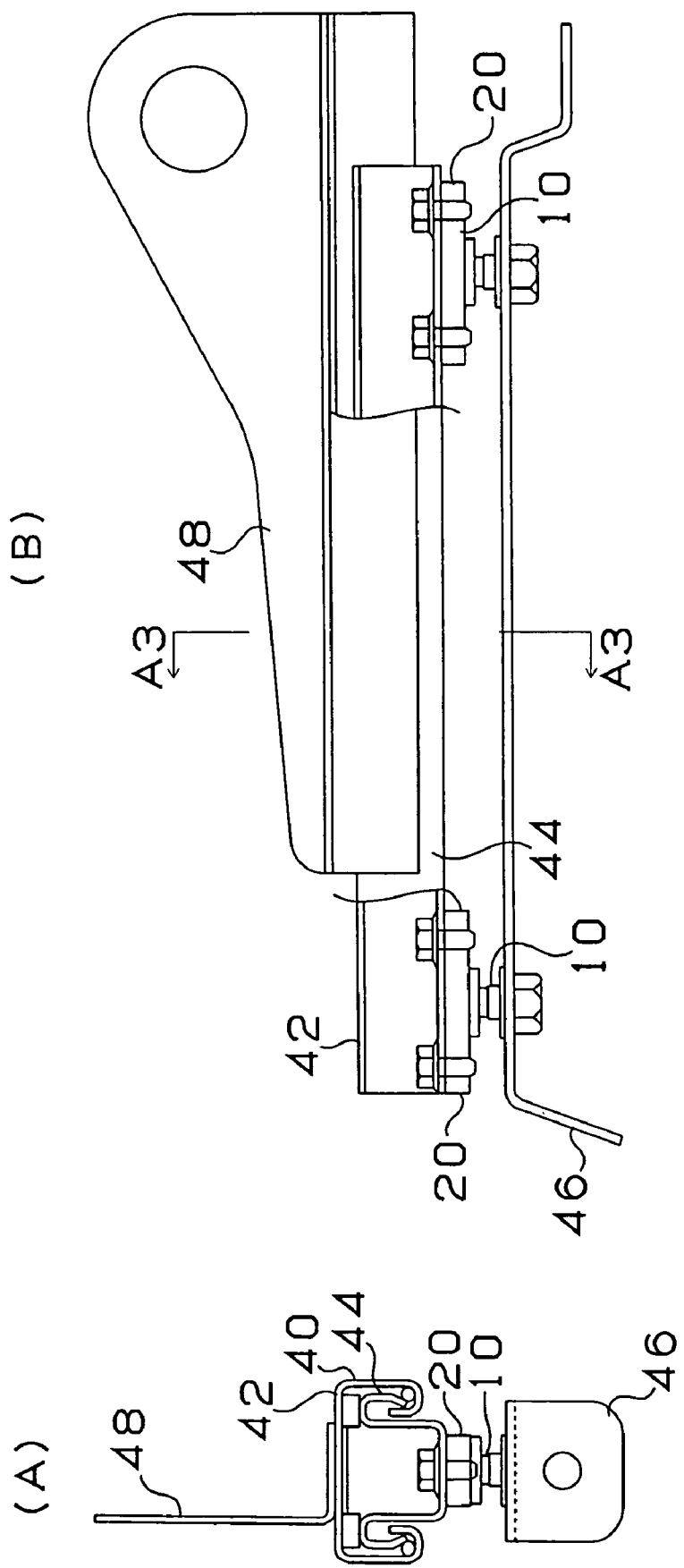
FIG. 6B is a side elevational view showing a state in which the occupant load sensor in accordance with the first embodiment is attached to a seat rail in accordance with further the other example.
FIG. 6A is a cross sectional view along a line A3—A3 in FIG. 6B.

FIGS. 5 and 6 show the other example of the mounted position of the occupant load sensor 10 in accordance with the first embodiment. FIG. 5B is a side elevational view showing a state in which the occupant load sensor in accordance with the first embodiment is attached to a seat rail in accordance with the other example, and FIG. 5A is a cross sectional view along a line A2—A2 in FIG. 5B. FIG. 6B is a side elevational view showing a state in which the occupant load sensor in accordance with the first embodiment is attached to a seat rail in accordance with further the other example, and FIG. 6A is a cross sectional view along a line A3—A3 in FIG. 6B.

In both of the other example shown in FIG. 5 and the other example shown in FIG. 6, the occupant load sensor 10 is arranged between the seat rail 40 and the foot 46 fixing the seat rail 40 to the floor. In this case, in the other example shown in FIG. 5, the flange portion 20 of the occupant load sensor 10 is arranged in an upper side of the lower rail 44. In the other example shown in FIG. 6, the flange portion 20 is arranged in a lower side of the lower rail 44. In the other example shown in FIG. 5, since the flange portion 20 of the occupant load sensor 10 is received within the seat rail 40, there is an advantage that the hip point of the seat can be lowered. In the other example shown in FIG. 6, there is an advantage that it is easy to attach the occupant load sensor 10.

Figure 7:
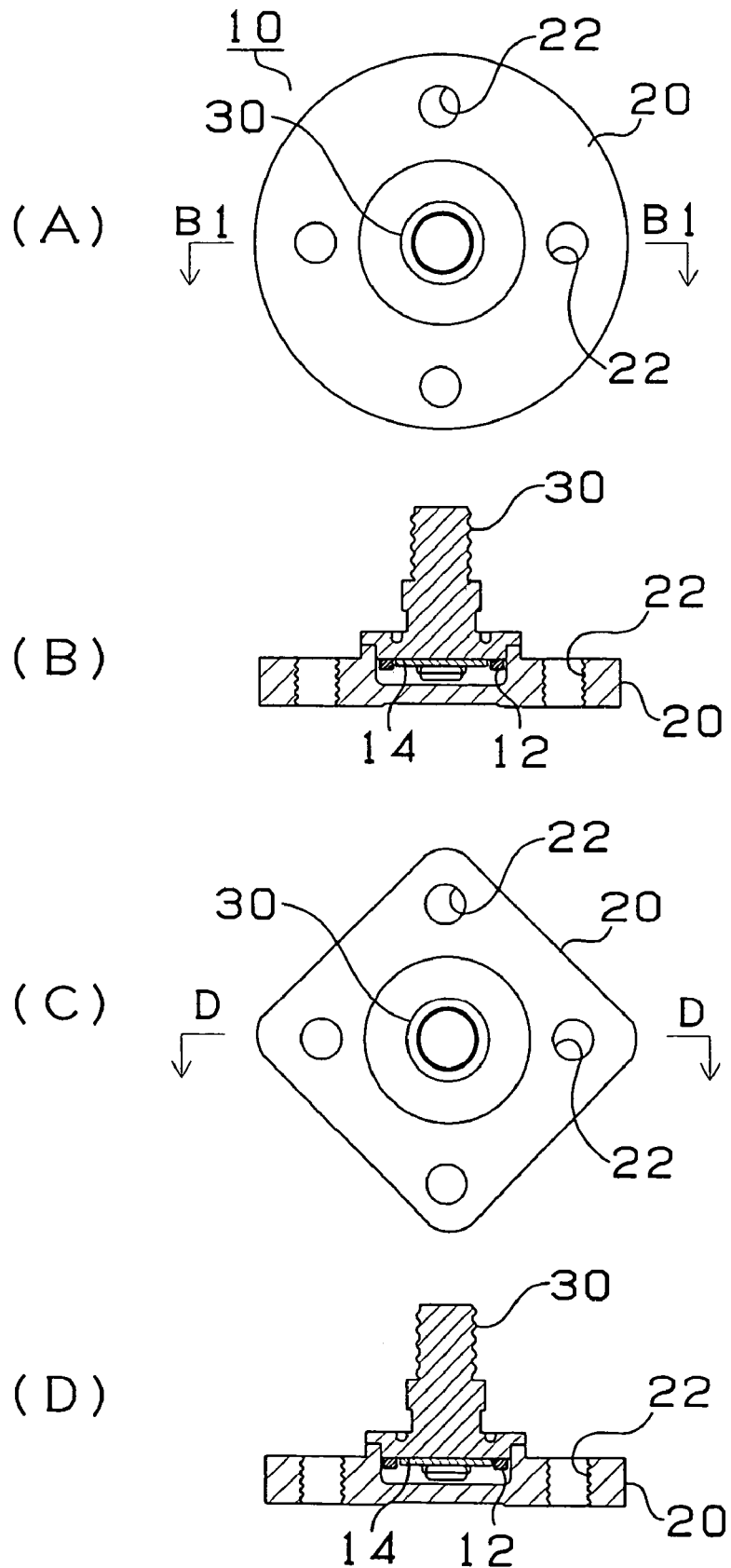
FIG. 7A is a plan view of an occupant load sensor in accordance with the other example of the first embodiment.
FIG. 7B is a cross sectional view along a line B1—B1 in FIG. 7A.
FIG. 7C is a plan view of an occupant load sensor in accordance with further the other example of the first embodiment.
FIG. 7D is a cross sectional view along a line D—D in FIG. 7C.

In the occupant load sensor 10 shown in FIG. 1, the flange portion 20 is formed in an approximately oval shape, however, the flange portion 20 may be formed in any other shapes. FIG. 7A is a plan view of an occupant load sensor in accordance with the other example of the first embodiment, and FIG. 7B is a cross sectional view along a line B1—B1 in FIG. 7A. FIG. 7C is a plan view of an occupant load sensor in accordance with further the other example of the first embodiment, and FIG. 7D is a cross sectional view along a line D—D in FIG. 7C.

In the other example shown in FIG. 7A, the flange portion 20 is formed in a circular shape. In further the other example shown in FIG. 7C, the flange portion 20 is formed in a quadrangular shape. In accordance with the shapes shown in FIGS. 7A and 7C, it is possible to improve an attaching strength by increasing the number of the fixing bolt.

[Modified Example of First Embodiment]

Figure 9:
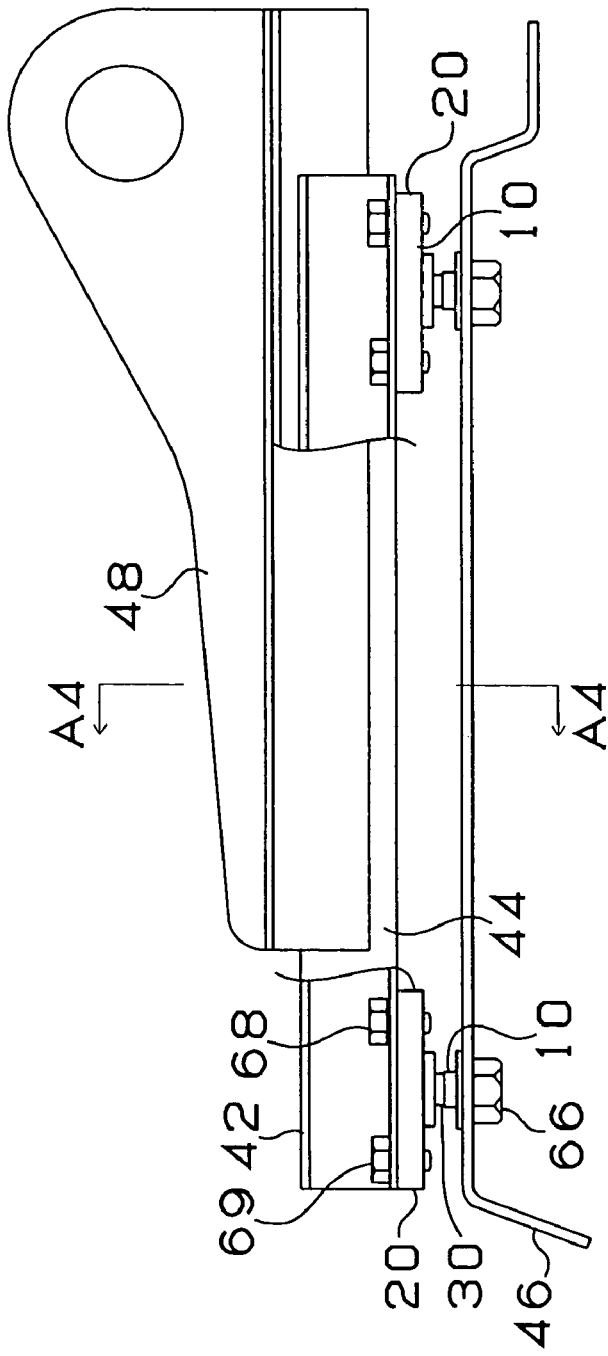
FIG. 9B is a side elevational view of a seat rail in accordance with a modified example of the first embodiment.
FIG. 9A is a cross sectional view along a line A4—A4 in FIG. 9B.

FIG. 8 shows an occupant load sensor 10 in accordance with a modified example of the first embodiment, and FIG. 9 shows a state in which the occupant load sensor 10 is attached to the seat rail. FIG. 9B is a side elevational view of the seat rail 40, and FIG. 9A is a cross sectional view along a line A4—A4 in FIG. 9B. FIG. 8A is an explanatory view of an attachment of the occupant load sensor, and FIG. 8B is a cross sectional view along a line B2—B2 in FIG. 9A.

The occupant load sensor in accordance with the first embodiment is fixed by the bolt 69. On the contrary, the occupant load sensor in accordance with the modified example of the first embodiment is fixed by a shoulder bolt 68 and a bolt 69.

As shown in FIG. 8B, the occupant load sensor 10 is constituted by a flange portion 20 which is in surface contact with a lower surface of the lower rail (the seat side fixing member) 44 and is attached by the shoulder bolt 68 and the bolt 69, and a bolt portion 30 which is formed in a vertical direction with respect to the flange portion 20 and is attached to the foot (the floor side seat fixing member) 46 side via the nut 66.

A description will be given of an attachment of the occupant load sensor 10 with reference to FIG. 8A.

First, the occupant load sensor 10 is fixed to the lower rail 44 side by inserting the bolt 69 and the shoulder bolt 68 from the upper surface side of the lower rail 44 via through holes 44a and 44b of the lower rail 44 and screwing into the screw hole 22 (refer to FIG. 1C) of the occupant load sensor 10. In this case, the bolt 69 is constituted by a head 69a and a thread 69b, and the shoulder bolt 68 is constituted by a head 68a, a step portion 68c and a thread 68b. A height F of the step portion 68c of the shoulder bolt 68 is formed 0.5 mm higher than a thickness G of the lower rail 44. In this case, the through hole 44a of the lower rail 44 is formed larger than an outer diameter of the step portion 68c of the shoulder bolt 68, and the opening 44b is formed larger than an outer diameter of the thread 69b of the bolt 69.

Next, the collar 60 is inserted to the thread 32 of the bolt portion 30, and is supported by the middle stage flange 34. The collar 60 is consitituted by the sleeve 60a and the flange 60b. On the other hand, a bushing (liner member) 62 constituted by a thin cylindrical liner is attached to a through hole 46a of the foot 46 for fitting to an inner surface. Further, as shown if FIG. 8B, the nut 66 is fixed to the thread 32 of the bolt portion 30 in a state in which the sleeve 60a of the collar 60 is inserted into the bushing 62.

In this case, the flange portion is firmly fixed to the lower rail 44 in a side to which the bolt 69 is attached. On the other hand, an air gap (a gap) C (0.5 mm) corresponding to a difference between the height F of the step portion 68c and the thickness G of the lower rail 44 mentioned above is formed in a side to which the shoulder bolt 68 is attached. The slight movement is allowed between the fixed position of the flange portion 20 in the side of the shoulder bolt 68 and the lower rail 44, on the basis of the gap C, and it is possible to make the torsion of the lower rail 44 hard to be transmitted to the occupant load sensor 10. Accordingly, the load from the seat side is applied to the sensor in the vertical direction, and it is possible to accurately detect the load. Further, since the slight movement is allowed between the fixed position of the flange portion 20 in the side of the shoulder bolt 68 and the lower rail 44 even if the accuracy of the attached position of the lower rail 44 with respect to the foot 46 is low, and the occupant load sensor is attached in a state in which the force in the other direction than the vertical direction is applied, the load from the seat side is applied to the sensor in the vertical direction, and it is possible to accurately detect the load.

In the modified example of the first embodiment, since the flange 60*b* of the collar 60 is brought into contact with the lower surface of the lower rail 44 to which the bolt portion 30 is fixed and the upper surface of the middle stage flange 34, and the load in the axial (vertical) direction is generated with respect to the sleeve 60*a*, the load from the seat is applied in the vertical direction, and it is possible to accurately measure the load by the sensor. Further, the number of the parts is reduced, and it is easy to assemble. In this case, it is possible to employ the sleeve provided with no flange as it is, in place of using the collar 60.

FIG. 10B is a side elevational view showing a state in which the occupant load sensor in accordance with the modified example of the first embodiment is attached to a seat rail in accordance with the other example, and FIG. 10A is a cross sectional view along a line A5—A5 in FIG. 10B.

Figure 10:
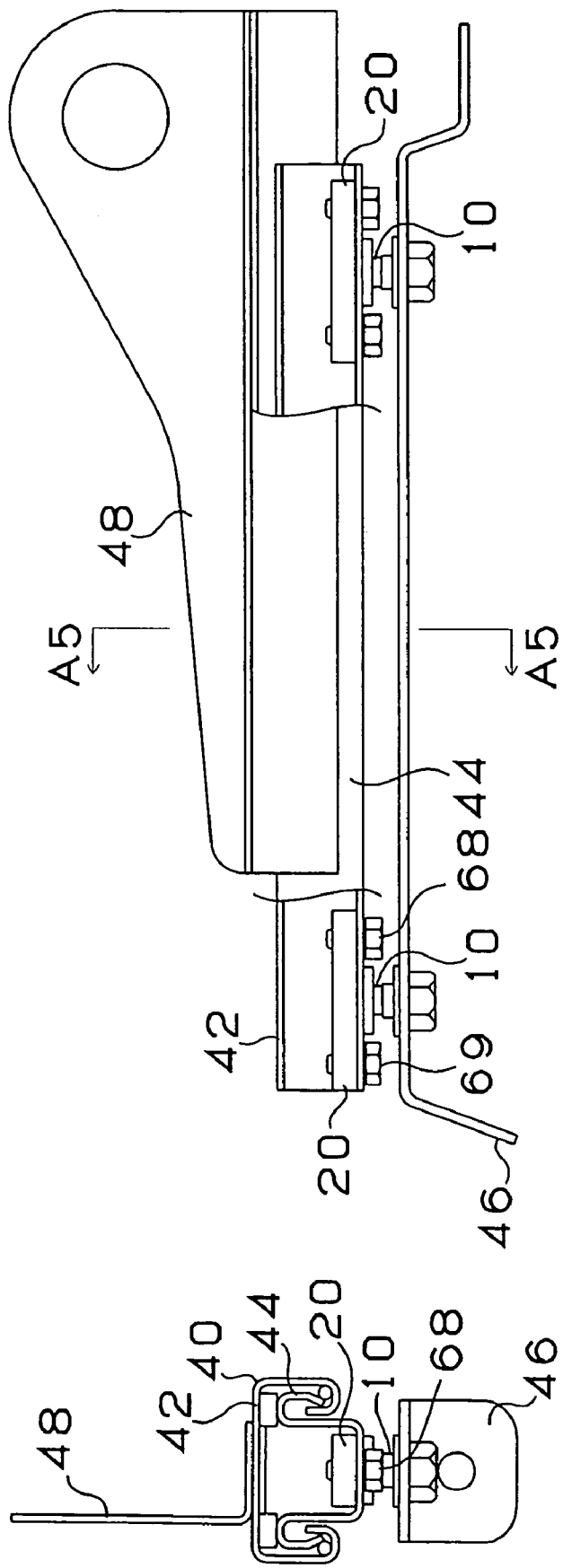
FIG. 10B is a side elevational view showing a state in which the occupant load sensor in accordance with the modified example of the first embodiment is attached to a seat rail in accordance with the other example.
FIG. 10A is a cross sectional view along a line A5—A5 in FIG. 10B.

In the other example shown in FIG. 10, the occupant load sensor 10 is arranged between the seat rail 40 and the foot 46 fixing the seat rail 40 to the floor in the same manner as the modified example of the first embodiment. In this case, in this other example, the flange portion 20 of the occupant load sensor 10 is arranged in the upper side of the lower rail 44. In this other example, since the flange portion 20 of the occupant load sensor 10 is received within the seat rail 40, there is an advantage that the hip point of the seat can be lowered.

[Second Embodiment]

FIG. 11A is a side elevational view showing a state before an occupant load sensor in accordance with a second embodiment is attached to a seat rail, and FIG. 11B is a side elevational view showing a state after being attached. As described above with reference to FIG. 3, in the first embodiment, the occupant load sensor 10 is fixed by interposing the bush 62 between the collar 60 and the through hole 48*a* of the bracket 48. On the contrary, in the second embodiment, a flat washer 64 is interposed between the bracket 48 and the nut 66, in place of the bush. In this case, since the occupant load sensor 10 in accordance with the second embodiment and the occupant load sensor 10 in accordance with the first embodiment have the same structure, a description thereof will be omitted while referring to FIGS. 1 and 2.

In accordance with the second embodiment, the occupant load sensor 10 is fixed to the bracket 48 via the sleeve 60*a* of the collar 60 arranged between the thread 32 of the bolt portion 30 and the through hole 48*a* of the bracket 48, and the flat washer 64 inserting the sleeve 60*a* therethrough and interposed between the bracket 48 and the nut 66. Accordingly, a slight movement is allowed between the bolt portion 30 and the bracket 48 to which the bolt portion 30 is fixed, on the basis of a gap formed between the thread 32 of the bolt portion 30 and the sleeve 60*a*, and a gap formed between the bracket 48 interposing the flat washer 64 therein and the nut 66, and it is possible to cancel the force applied from the other directions than the vertical direction. Accordingly, the load from the seat side is applied to the sensor 12 (refer to FIG. 1C) in the vertical direction, and it is possible to accurately detect the load. Further, since the slight movement is allowed between the bolt portion 30 and the bracket 48 even if the accuracy of the attaching position of the bracket 48 with respect to the seat rail 40 is low, and the occupant load sensor 10 is attached in a state in which the force in the other directions than the vertical direction is applied, the load from the seat side is applied to the sensor 12 in the vertical direction, and it is possible to accurately detect the load.

[Modified Example of Second Embodiment]

Figure 12:
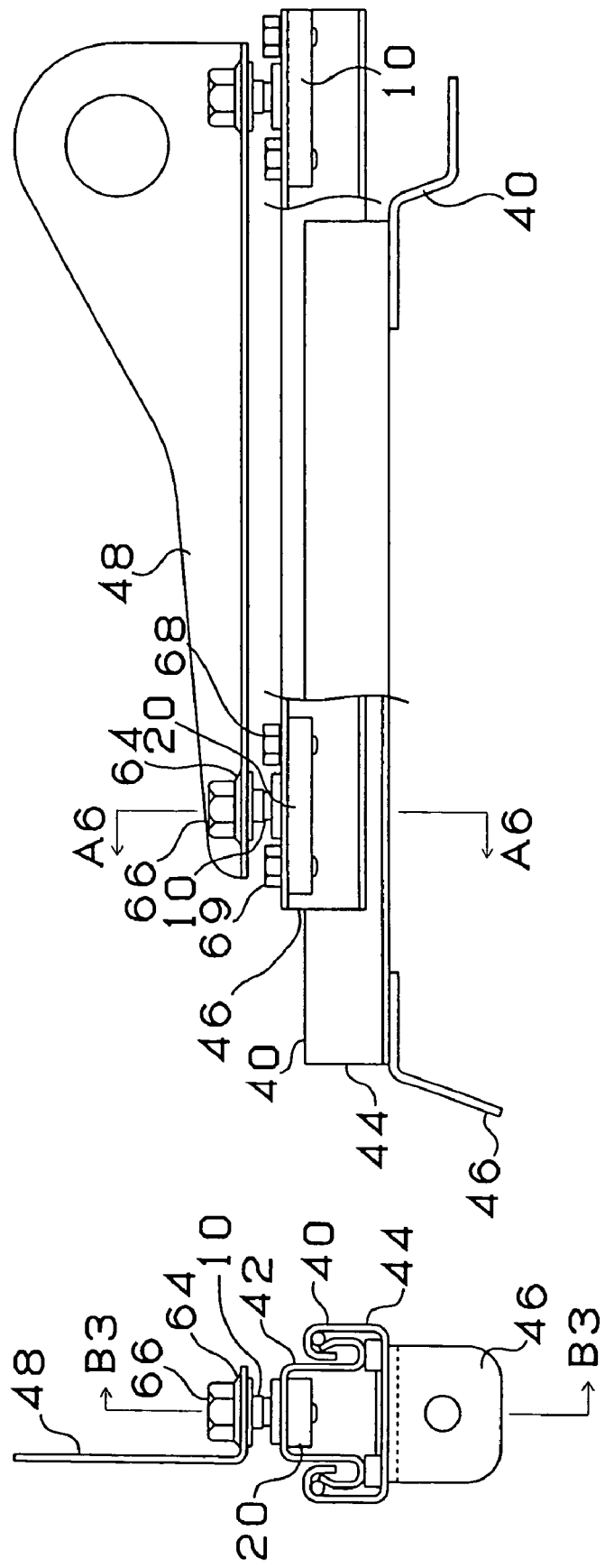
FIG. 12B is a side elevational view showing a state in which an occupant load sensor in accordance with a modified example of the second embodiment is attached to the seat rail.
FIG. 12A is a cross sectional view along a line A6—A6 in FIG. 12B.

FIG. 12B is a side elevational view showing a state in which an occupant load sensor in accordance with a modified example of the second embodiment is attached to the seat rail, and FIG. 12A is a cross sectional view along a line A6—A6 in FIG. 12B. The occupant load sensor in accordance with the second embodiment is fixed to the seat rail by the bolt 69. On the contrary, the occupant load sensor in accordance with the modified example of the second embodiment is fixed to the seat rail by the shoulder bolt 68 and the bolt 69. In the modified example of the second embodiment, the occupant load sensor 10 is arranged between the upper rail 42 of the seat rail 40 and the bracket 48 fixing the seat. FIG. 13A is a side elevational view showing a state before the occupant load sensor in accordance with the modified example of the second embodiment is attached to the seat rail, and FIG. 13B is a side elevational view showing a state after being attached. FIG. 13B corresponds to the cross sectional view along a line B3—B3 in FIG. 12A.

[Third Embodiment]

A description will be given of an occupant load sensor in accordance with a third embodiment of the present invention with reference to FIG. 14. FIGS. 14A and 14B are explanatory views showing an attached position of the occupant load sensor with respect to the seat in accordance with the first embodiment, and FIG. 14C is an explanatory view showing the occupant load sensor in accordance with the third embodiment.

In the occupant load sensor 10 in accordance with the first embodiment, as shown in FIG. 14B, in the case that the attached position of a pair of seat rails 40 is largely deflected, the occupant load sensor 10 is attached in a state in which the force in the other directions than the vertical direction is applied, so that it is hard to accurately detect the load. On the contrary, the occupant load sensor 10 in accordance with the third embodiment is structured such that a pair of seat rails 40 are connected via a connection bracket 52, thereby preventing a relative attached position from being deflected. Accordingly, it is possible to prevent the occupant load sensor from being attached in a state in which the force in the other directions than the vertical direction is applied.

In accordance with the third embodiment, the occupant load sensor 10 can be arranged at various positions in the same manner as that of the first embodiment which is described above with reference to FIGS. 4 to 6. Further, it is possible to comparatively accurately measure even by using the occupant load sensor 110 in accordance with the prior art which is described above with reference to FIG. 15.

What is claimed is:

1. An occupant load sensor interposed between a floor side seat fixing member and a seat side fixing member and provided for measuring a load of an occupant sitting on a seat, wherein said occupant load sensor comprising:
    a fixing portion which is attached to one of said floor side seat fixing member and said seat side fixing member;
    a bolt portion which is inserted to a through hole in the other of said floor side seat fixing member and said seat side fixing member and is attached via a nut; and
    a sensor which is arranged in a strain surface provided between said fixing portion and said bolt portion, and is provided for detecting a load applied to said bolt portion in an axial direction, and wherein said occupant load sensor is fixed to the other of said floor side seat fixing member and said seat side fixing member via a sleeve arranged in an outer periphery of said bolt portion, and a liner member interposed between said sleeve and the through hole in the other of said floor side seat fixing member and said sear side fixing member;

wherein there is a first gap formed between the bolt portion and the sleeve, and a second gap formed between the sleeve and the liner member.

2. An occupant load sensor interposed between a floor side seat fixing member and a seat side fixing member and provided for measuring a load of an occupant sitting on a seat, wherein said occupant load sensor comprising:

a flange portion which is attached to one of said floor side seat fixing member and said seat side fixing member while being in surface contact therewith;

a bolt portion which is formed in a vertical direction with respect to said flange portion and is attached to the other of said floor side seat fixing member and said seat side fixing member via a nut; and a sensor which is arranged in a strain surface provided between said flange portion and said bolt portion, and is provided for detecting a load applied to said bolt portion in an axial direction, and wherein said occupant load sensor is fixed to the other of said floor side seat fixing member and said seat side fixing member via a sleeve arranged in an outer periphery of said bolt portion, and a bushing interposed between said sleeve and a through hole in the other of said floor side seat fixing member and said seat side fixing member;

wherein there is a firs gap formed between the bolt portion and the sleeve, and a second gap formed between the sleeve and the bushing.

3. An occupant load sensor interposed between a floor side seat fixing member and a seat side fixing member and provided for measuring a load of an occupant sitting on a seat, wherein said occupant load sensor comprising:

a flange portion which is attached to one of said floor side seat fixing member and said seat side fixing member while being in surface contact therewith;

a bolt portion which is formed in a vertical direction with respect to said flange portion and is attached to the other of said floor side seat fixing member and said seat side fixing member via a nut; and a sensor which is arranged in a strain surface provided between said flange portion and said bolt portion, and is provided for detecting a load applied to said bolt portion in an axial direction, and wherein said occupant load sensor is fixed to the other of said floor side seat fixing member and said seat side fixing member via a sleeve arranged between said bolt portion and a through bole in the other of said floor side seat fixing member and said seat side fixing member, and a flat washer inserting said sleeve therethrough and interposed between the other of said floor side seat fixing member and said seat side fixing member and a nut;

wherein there is a gap formed between the bolt portion and the sleeve.

4. An occupant load sensor as claimed in claim 1, wherein said sleeve is a part of a collar.

5. An occupant load sensor as claimed in claim 1, wherein a pair of said floor side seat fixing members are connected via a bracket.

6. An occupant load sensor as claimed in claim 2, wherein said sleeve is a part of a collar.

7. An occupant load sensor as claimed in claim 3, wherein said sleeve is a part of a collar.

8. An occupant load sensor as claimed in claim 2, wherein a pair of said floor side seat fixing members are connected via a bracket.

9. An occupant load sensor as claimed in claim 3, wherein a pair of said floor side seat fixing asters are connected via a bracket.

10. An occupant load sensor as claimed in claim 4, wherein a pair of said floor side seat fixing asters are connected via a bracket.

* * * * *